United States Patent [19]

Rourke et al.

[11] Patent Number: 4,898,719

[45] Date of Patent: Feb. 6, 1990

[54] LIQUID EXTRACTION PROCEDURE FOR THE RECOVERY OF SCANDIUM

[75] Inventors: William J. Rourke, Worcester; Wen-Chao Lai, Westboro; Samuel Natansohn, Sharon, all of Mass.

[73] Assignee: GTE Laboratories Incorporated, Waltham, Mass.

[21] Appl. No.: 321,603

[22] Filed: Mar. 10, 1989

Related U.S. Application Data

[63] Continuation of Ser. No. 41,815, Apr. 23, 1987, abandoned.

[51] Int. Cl.$^4$ .............................................. C01F 17/00
[52] U.S. Cl. ........................... 423/21.5; 423/DIG. 14; 423/263; 75/121; 210/634; 210/638; 210/639; 210/681; 210/688
[58] Field of Search .............. 423/21.5, 263, DIG. 14; 75/121; 210/634, 638, 639, 681, 688

[56] References Cited

U.S. PATENT DOCUMENTS

| | | | |
|---|---|---|---|
| 2,874,039 | 5/1959 | Pruvot | 75/84.5 |
| 3,013,859 | 12/1961 | Kuhlman, Jr. et al. | 23/22 |
| 3,146,063 | 8/1964 | Moore et al. | 423/21.5 |
| 4,025,602 | 5/1977 | Campbell et al. | 423/7 |
| 4,500,494 | 2/1985 | Scher | 210/688 |
| 4,624,703 | 11/1986 | Vanderpool et al. | 423/150 |
| 4,626,280 | 12/1986 | Vanderpool et al. | 423/150 |
| 4,718,996 | 1/1988 | Vanderpool et al. | 423/21.5 |

OTHER PUBLICATIONS

Langade et al., "Solvent Extraction of Scandium (III)", Anal. Chem. 52, 2031–2033, Nov. 1980.
Sanad et al., "Extraction of Antimony with Tertiary Amines", Talanta, 1967, vol. 14, pp. 659–668 (Pergamon Press).
Selmer-Olsen, "Solvent Extraction of Chlorocomplexes by Triisooctylamine/Carbon Tetrachloride from Hydrochloric Acid Medium", ACTA Chemica Scandinavica 20 (1966), No. 6.
Spitzer, "The Use of Organic Chemicals for the Selective Liquid/Liquid Extraction of Metals", Ingenieursblad, vol. 41, 1972, pp. 418–423.

*Primary Examiner*—Robert L. Stoll
*Attorney, Agent, or Firm*—Ivan L. Ericson; Frances P. Craig

[57] ABSTRACT

A process for recovering the scandium present as a trace constituent in a mixture of iron, manganese and other oxides comprise bringing the scandium into solution along with much of the other base metals, reducing the dissolved iron to the ferrous state, adjusting the pH of the resulting solution to a value of about 2.0 and selectively extracting the scandium with an organic extractant consisting of thenoyltrifluoroacetone dissolved in an aromatic solvent. The scandium values are recovered quantitatively from the organic extractant by treating it with a dilute acid. The process effects a complete separation of the scandium from the base metals resulting in a scandium product of high purity.

7 Claims, No Drawings

LIQUID EXTRACTION PROCEDURE FOR THE RECOVERY OF SCANDIUM

This is a continuation of co-pending application Ser. No. 041,815 filed on Apr. 23, 1987, now abandoned.

FIELD OF THE INVENTION

This invention relates to a method for the recovery of scandium. More particularly, this invention relates to a liquid extraction method for the recovery of scandium.

BACKGROUND OF THE INVENTION

Scandium, although quite abundant, is a relatively unutilized element partly because there are no convenient (high grade) sources of the metal. Therefore, fulfillment of scandium's technological promise in such fields as alloys, ceramics, phosphors, etc. awaits a readily available economical source of the material.

Important low level sources of scandium include uranium tailings and the waste sludges of tungsten recovery plants which process ores such as scheelite and wolframite. The sludge from such plants consists largely of mixed manganese, iron and other hydrous oxides with varying levels of scandium, typically in the range of 100–1000 ppm.

Processes which attempt to recover scandium from such a material face the problem that the waste is extremely complex and heterogeneous chemically. About two dozen other elements are present in greater or lesser amounts. Furthermore, the low level of scandium present mandates processing large quantities of the sludge. Patented procedures for the separation of scandium from trivalent iron and other metals have disadvantages which make them ill-suited to the large scale production of scandium. For instance, an extraction-based procedure (U.S. Pat. No. 3,013,859) requires that 2.5 lbs/gal of magnesium nitrate be added to the aqueous phase before equilibration with the alkyl phosphate extractant. On the large scale such a procedure would be both expensive, requiring large quantities of magnesium nitrate, and would introduce the problem of disposing or recovering the magnesium nitrate.

Another patented procedure (U.S. Pat. No. 2,874,039) involves the separation of scandium from iron and other metals by volatilization of the chlorides in a furnace at about 1000° C. Such a procedure would be high in energy consumption and low in throughput.

The procedure of the instant invention on the other hand eliminates these objections.

SUMMARY OF THE INVENTION

In accordance with one aspect of the present invention, a new and improved method for recovering scandium comprises the following steps:

Step 1—Scandium contained in a solid is dissolved to form an aqueous solution comprising the scandium.

Step 2—The product from step 1 which contains scandium is adjusted to an acidic pH.

Step 3—The scandium contained in the product from step 2 is extracted by contacting the product from step 2 with an organic mixture comprising an organic extractant and an organic solvent forming an organic mixture containing the scandium.

Step 4—The organic mixture containing the scandium is contacted with an aqueous stripping solution to transfer the scandium contained in the organic mixture to the aqueous stripping solution.

Step 5—The scandium contained in the aqueous stripping solution is precipitated from the aqueous stripping solution.

Step 6—The precipitated scandium is separated from the aqueous stripping solution.

In accordance with another aspect of the present invention, a new and improved method for recovering scandium comprises the following steps:

Step 1—Scandium contained in a solid is dissolved to form an aqueous solution comprising the scandium.

Step 2—The aqueous solution containing scandium is treated with metallic iron.

Step 3—The product from step 2 which contains scandium is adjusted to an acidic pH.

Step 4—The scandium contained in the product from step 3 is extracted by contacting the product from step 3 with an organic mixture comprising an organic extractant and an organic solvent forming an organic mixture containing the scandium.

Step 5—The organic mixture containing the scandium is contacted with an aqueous stripping solution to transfer the scandium contained in the organic mixture to the aqueous stripping solution.

Step 6—The scandium contained in the aqueous stripping solution is precipitated from the aqueous stripping solution.

Step 7—The precipitated scandium is separated from the aqueous stripping solution.

DETAILED DESCRIPTION OF THE INVENTION

The process of the present invention is a liquid-liquid extraction, an attractive operation from an engineering standpoint because a bank of mixer-settler units can process feed solution on a continuous as opposed to batch basis. Furthermore, there is no requirement that any reagents be added to the aqueous phase before the extraction.

A process for recovering scandium substantially free of the major and minor constituents of wolframite processing waste comprises the steps of:

(a) Dissolving the scandium bearing portion of the solid with an appropriate acid medium.

(b) Reducing any dissolved iron to the ferrous state by contacting the solution with iron metal.

(c) Adjusting the pH to the range of 1.8–2.0.

(d) Extracting the scandium by contacting the aqueous phase with an organic extractant comprising thenoyltrifluoroacetone (TTA) dissolved in an aromatic organic solvent such as toluene or SC-150 (a mixture of aromatic hydrocarbons).

(e) Contacting the separated organic phase with an aqueous stripping solution of a mineral acid to transfer the scandium quantitatively from the organic to the aqueous phase, simultaneously regenerating the extractant.

(f) Recycling the regenerated organic extractant to Step d and recycling the stripping acid to Step e.

(g) Recovering the scandium from the aqueous stripping acid as a solid product by precipitation with hydroxide or oxalate ions (after it has been built up to a satisfactory level through many cycles).

According to the process of the present invention, the scandium is recovered in a form essentially free of iron and manganese, the major constituents of the starting material, in which they are present in concentrations of upwards of 20 w/o. Typically such a material contains w/o of iron, 20 w/o of manganese, and 0.05 w/o (500 ppm) of scandium so that the weight ratio of iron to scandium is 400 and the molar ratio is 320. The similarities in the chemical properties of the two ions in acid solution, the trivalent (ferric) iron and the trivalent scandium, are so great so as to make a simple and effective separation of the two metals by chemical means impractical.

In accordance with the present invention the recovery of scandium from aqueous solutions which contain a high concentration of trivalent iron and a small amount of scandium is made possible by reducing the iron from its trivalent state to the divalent state. This may be done conveniently through the reaction with elemental iron according to the equation:

$$Fe^\circ + 2Fe^{3+} \rightarrow 3Fe^{2+}$$

The chemical behavior of divalent (ferrous) iron is sufficiently different so as to permit complete and effective separation of the scandium from even a large excess of iron by a simple chemical step such as liquid-liquid extraction as taught by this invention. Other chemical separation techniques such as ion exchange or selective precipitation are also effective as long as the iron is maintained in its divalent state. The process described in this invention is equally applicable to solutions in which the concentrations of iron and scandium are of comparable magnitude but is illustrated here on a system with a very large excess of iron because this represents the most difficult case.

Typically, the complex matrix of metallic oxides containing the scandium values is treated with a dilute mineral acid such as 1N $H_2SO_4$ to bring all of the scandium into solution. This also solubilizes the transition metals such as iron and manganese with each of their concentrations in the solution being several hundred times that of scandium. The dissolution is performed at room temperature and the resulting pH is in the range of 1.25–1.30. The requisite amount of metallic iron powder is then added to the solution to reduce the ferric iron to the ferrous state. At this pH the reduction takes place readily in one hour or less as evidenced by the negative response to the thiocyanate test for $Fe^{3+}$.

After the reduction of the dissolved iron the solution is adjusted to pH 1.85–2.0. The extraction of scandium is strongly pH dependent. At pH of 1.3 the extraction efficiency is only about 20%; it increases rapidly in the range of 1.5–2.0 approaching 100% at pH of 2.0. The aqueous scandium containing solution is then contacted with an organic extractant solution comprising thenoyltrifluoroacetone (TTA) in an aromatic organic solvent. The TTA forms a very stable neutral chelate complex with scandium and shows a high degree of selectivity for scandium over the divalent transition metals, alkaline earths, alkali metals and rare earths present in the system.

The neutral scandium TTA complex is poorly soluble in aqueous but very soluble in organic media. Therefore, it migrates preferentially to the organic phase. Suitable solvents for the organic extractant are toluene, xylene and SC#150 solvent. SC#150 consists essentially of a mixture of alkyl benzenes wherein the alkyl benzenes have molecular weights of 120, 134, or 148 and the total number of carbon atoms attached to the benzene ring is either 3, 4, or 5. Typical constituents include trimethyl benzene, ethyl benzene, dimethylethyl benzene, methyl propyl benzene, tetramethyl benzene, diethyl toluene, dimethylisopropyl benzene, and the like. The material is sold by Buffalo Solvents and Chemicals Corporation under the trade name of SC#150. Aliphatic solvents are not suitable because of their poor solvating power toward the TTA reagent.

The concentration of TTA in the organic extractant solution is preferably 0.5 M; lesser concentrations result in poorer extraction efficiency despite being in excess of the molar concentration of scandium.

The volume ratio of the aqueous scandium containing solution to organic extractant is typically in the range of 1 to 10 parts aqueous solution to 1 part organic extractant. Contact times of 1 to 5 minutes are sufficient for complete extraction as shown in the following examples, indicating the high efficiency of TTA in extracting scandium from aqueous solutions.

The scandium values are stripped from the organic extractant solution with an aqueous solution of a mineral acid such as hydrochloric, sulfuric or nitric. The preferred ratio of solution volumes in this step is one part aqueous to 10 parts organic extractant solution. The stripping process is strictly pH controlled, so an acid of moderate strength such as 3N hydrochloric acid can be used to strip many volumes of scandium loaded organic in succession. In this way scandium concentration in the stripping acid can be increased several hundred fold. The stripped organic extractant can be recycled many times to contact fresh aqueous feed solution.

The scandium contained in the acidic stripping solution may be conveniently recovered by precipitation as the hydroxide or oxalate. The scandium product obtained by oxalate precipitation is purer than that obtained by hydroxide precipitation.

The process of this invention affords a recyclable method for extracting scandium from low level sources containing large quantities of iron and other metals. It produces process streams containing scandium essentially free of iron and manganese and in concentrations which make feasible the production of scandium oxide by known procedures. Furthermore, the reagents are recyclable thus minimizing the consumption of chemicals. The following examples are provided to enable one skilled in the art to practice the present invention and are not to be construed as limiting the scope of the invention but as merely illustrative thereof.

EXAMPLE 1

One hundred grams of wolframite processing waste was reacted with 2½ liters of 1N sulfuric acid containing 6% hydrogen peroxide for a period of 2 hours. The slurry was filtered to separate the undissolved solids and the resulting solution of pH 1.30 analyzed to contain 5635 ppm manganese, 3080 ppm iron, 350 ppm calcium and 14.1 ppm scandium. The iron in this solution was reduced to the ferrous state by adding to it 4.68 g of powdered iron. Then the solution pH was adjusted to the pH of 1.85 using approximately 30ml of concentrated ammonium hydroxide.

This solution was contacted in 300 ml portions with 300 ml of organic extractant consisting of 33.6 g of TTA dissolved in toluene. The phases were separated after 5 minutes equilibration time. The organic extractant was stripped by contacting it with 200 ml 3N hydrochloric acid for 5 minutes. It was then recycled to contact another 300 ml of aqueous feed solution. Analysis of the aqueous raffinates shows that extraction efficiency remains high through many cycles as illustrated in Table I.

TABLE I

| Stage | Feed Solution | Raffinate | % Extracted |
|---|---|---|---|
| 1 | 14.1 ppm | 0.59 ppm | 95.8% |
| 2 | 14.1 ppm | 0.57 ppm | 96.0% |
| 3 | 14.1 ppm | 0.71 ppm | 95.0% |
| 4 | 14.1 ppm | 0.65 ppm | 95.4% |
| 5 | 14.1 ppm | 0.54 ppm | 96.2% |
| 6 | 14.1 ppm | 0.52 ppm | 96.3% |
| 7 | 14.1 ppm | 0.58 ppm | 95.9% |
| 8 | 14.1 ppm | 0.51 ppm | 96.4% |
| 9 | 14.1 ppm | 0.84 ppm | 94.0% |

The same stripping solution was used for each of the extraction steps. At the end of the ninth extraction stage the stripping acid contained 84% of the extracted scandium.

Ammonium hydroxide was added to the stripping solution to precipitate the scandium values as the hydroxide which were filtered and then calcined to the oxide. The product obtained was shown to consist of 80.5% $Sc_2O_3$, 16% $ThO_2$ and about 1.5% $TiO_2$, 1% $Fe_2O_3$ and 1% $SiO_2$.

EXAMPLE 2

The steps of example 1 were repeated with the following modifications:
1. The aqueous to organic phase ratio in the extraction was 1:10.
2. Precipitation with oxalic acid instead of ammonium hydroxide was used to recovery scandium from the stripping acid.

The product obtained after calcination was found by analysis to consist of 89% $Sc_2O_3$ and 11% $ThO_2$. All the transition metals combined amounted to only 350 ppm. This shows that oxalate precipitation gives a purer product than hydroxide precipitation.

While there have been described what are at present considered the preferred embodiments of the invention it will be obvious to those skilled in the art that various changes may be made therein without departing from the scope of the invention as defined by the appended claims.

What is claimed is:

1. A method for recovering scandium comprising the following steps:

Step 1—dissolving scandium from a solid comprising iron, manganese, and scandium to form an aqueous solution comprising an amount of said scandium, and said iron, said amount of said iron in said aqueous solution being greater than said amount of said scandium in said solution;

Step 2—reducing any ferric iron in said aqueous solution containing said scandium;

Step 3—adjusting the product from step 2 containing said scandium to an acidic pH from about 1.8 to about 2.0 to form an acidic solution;

Step 4—selectively extracting said scandium with respect to iron from said acidic solution by contacting said acidic solution with an organic mixture forming an organic mixture containing said scandium, said organic mixture comprising an organic extractant and an organic solvent, said organic extractant comprising thenoyltrifluoroacetone;

Step 5—contacting said organic mixture containing said scandium with an aqueous stripping solution to transfer said scandium contained in said organic mixture to said aqueous stripping solution, said stripping solution comprising a mineral acid;

Step 6—precipitating said scandium contained in said aqueous stripping solution; and Step 7—separating said precipitated scandium from said aqueous stripping solution.

2. A method in accordance with claim 1 wherein said organic solvent comprises a mixture of alkyl benzenes wherein the alkyl benzenes have molecular weights of 120, 130, or 148 and the total number of carbon atoms attached to the benzene ring is either 3, 4, or 5.

3. A method in accordance with claim 1 wherein said organic solvent comprises toluene.

4. A method in accordance with claim 1 wherein said precipitating comprises the addition of oxalate ions to said aqueous stripping solution containing said scandium.

5. A method in accordance with claim 1 wherein said precipitating comprises the addition of hydroxide ions to said aqueous stripping solution containing said scandium.

6. A method in accordance with claim 1 wherein said dissolving in step 1 comprises dissolving scandium with 1N $H_2SO_4$.

7. A method in accordance with claim 10 wherein said ferric iron in said aqueous solution containing said scandium in Step 2 is reduced with metallic iron.

* * * * *